United States Patent
Morley et al.

(10) Patent No.: US 12,552,905 B2
(45) Date of Patent: Feb. 17, 2026

(54) ADDITIVE STABILIZATION

(71) Applicants: DOW SILICONES CORPORATION, Midland, MI (US); DOW GLOBAL TECHNOLOGIES LLC, Midland, MI (US)

(72) Inventors: Timothy Morley, Midland, MI (US); Todd Johnson, Elizabethtown, KY (US); Ashish Kotnis, Midland, MI (US); Kelly Doede, Midland, MI (US); Eb Debrah, Midland, MI (US)

(73) Assignees: DOW SILICONES CORPORATION, Midland, MI (US); DOW GLOBAL TECHNOLOGIES LLC, Midland, MI (US)

( * ) Notice: Subject to any disclaimer, the term of this patent is extended or adjusted under 35 U.S.C. 154(b) by 532 days.

(21) Appl. No.: 18/028,727

(22) PCT Filed: Sep. 21, 2021

(86) PCT No.: PCT/US2021/051177
§ 371 (c)(1),
(2) Date: Mar. 27, 2023

(87) PCT Pub. No.: WO2022/072164
PCT Pub. Date: Apr. 7, 2022

(65) Prior Publication Data
US 2023/0365763 A1 Nov. 16, 2023

Related U.S. Application Data

(60) Provisional application No. 63/085,214, filed on Sep. 30, 2020.

(51) Int. Cl.
| | | |
|---|---|---|
| C08L 83/04 | (2006.01) | |
| C08G 77/04 | (2006.01) | |
| C08G 77/16 | (2006.01) | |
| C08J 3/22 | (2006.01) | |
| C08K 3/22 | (2006.01) | |
| C08K 3/34 | (2006.01) | |
| C08K 5/00 | (2006.01) | |

(52) U.S. Cl.
CPC ............ *C08J 3/226* (2013.01); *C08G 77/045* (2013.01); *C08G 77/16* (2013.01); *C08K 3/22* (2013.01); *C08K 3/34* (2013.01); *C08K 5/005* (2013.01); *C08K 5/0066* (2013.01); *C08L 83/04* (2013.01); *C08J 2383/06* (2013.01); *C08J 2483/06* (2013.01); *C08K 2003/2265* (2013.01)

(58) Field of Classification Search
CPC ........ C08G 77/045; C08J 3/226; C08L 83/04; C09D 183/04; C09J 183/04
See application file for complete search history.

(56) References Cited

U.S. PATENT DOCUMENTS

| | | | |
|---|---|---|---|
| 3,996,184 A | 12/1976 | Klosowski | |
| 5,017,628 A | 5/1991 | Dietlein | |
| 5,246,980 A | 9/1993 | Palmer et al. | |
| 5,670,560 A * | 9/1997 | Lower | C10L 1/221 524/588 |
| 5,904,988 A * | 5/1999 | Stein | C09D 5/1675 523/213 |
| 6,288,143 B1 * | 9/2001 | Caradori | C08K 9/06 523/213 |
| 6,391,234 B1 * | 5/2002 | Silvi | B01F 33/821 524/588 |
| 6,462,104 B1 * | 10/2002 | Canpont | C08K 3/36 523/213 |
| 2008/0033074 A1 | 2/2008 | Prasse | |
| 2009/0110658 A1 * | 4/2009 | Sakamoto | C09D 5/1675 424/78.09 |
| 2010/0099793 A1 | 4/2010 | Wunder | |

FOREIGN PATENT DOCUMENTS

EP 0802233 A2 10/1997

OTHER PUBLICATIONS

International Search Report for PCT/US2021/051177 dated Feb. 8, 2022, 4 pages.

* cited by examiner

*Primary Examiner* — Marc S Zimmer
(74) *Attorney, Agent, or Firm* — Warner Norcross + Judd LLP

(57) ABSTRACT

There is provided a process for stabilizing additive concentrates comprising or consisting of one or more additives in dialkylsilanol terminated polydiorganosiloxane polymers for use in condensation curable organosiloxane compositions. Processes for making condensation curable organosiloxane compositions incorporating the additive concentrates as well as the use of the stabilized additive concentrates in condensation cure organosiloxane compositions are also described. The stabilizer used is a polydialkylsiloxane having the general formula: $R^3_3-Si-O-((R^2)_2SiO)_d-Si-R^3_3$ where $R^2$ is an alkyl or phenyl group, each $R^3$ group may be the same or different and are selected from $R^2$ alkenyl or alkynyl groups and the average value of d is between 7 and 20, in an amount of from 0.5 to 5 wt. % of the composition.

15 Claims, No Drawings

ADDITIVE STABILIZATION

CROSS-REFERENCE TO RELATED APPLICATIONS

The application is the U.S. National Stage of PCT/US2021/051177 filed on 21 Sep. 2021, which claims priority to and all advantages of U.S. Provisional Patent Application No. 63/085,214 filed on 30 Sep. 2020, the content of which is incorporated herein by reference.

This disclosure concerns a process for stabilizing additive concentrates comprising or consisting of one or more additives in dialkylsilanol terminated polydiorganosiloxane polymers for use in condensation curable organosiloxane compositions; processes for making condensation curable organosiloxane compositions incorporating said additive concentrates as well as the use of said stabilized additive concentrates in condensation cure organosiloxane compositions.

Condensation curable organosiloxane compositions, which cure to elastomeric solids, are well known. Typically, such compositions contain the following essential components:

(a) a polydiorganosiloxane having at least two hydroxy groups or hydrolysable groups per molecule,
(b) one or more silane or siloxane cross-linking agents reactive with the polydiorganosiloxane (a), for example an acetoxy silane or an oximosilane, and
(c) a condensation cure catalyst.

Usually they also include (d) one or more reinforcing or semi-reinforcing fillers.

These condensation curable organosiloxane compositions are used for a wide variety of applications not least because the elastomeric materials cured from such compositions are well known in the art for being able to withstand harsh conditions because of their mechanical performance and chemical resistance. In order to ensure the elastomeric materials are able to provide the necessary performance for the application for which they are designed, many of the compositions require one or more additives to be included in the compositions. Such additives usually comprise other fillers e.g. non-reinforcing fillers, electrically conductive fillers and heat conductive fillers or any combination thereof dependent on the end use of the elastomeric product made when the composition is cured.

Similarly, many other additives are included to provide desired properties dependent on the end use. These may include one or more of, for the sake of example, pigments, dyes, co-catalysts; scavengers, rheological modifiers; adhesion promoters, heat stabilizing agents, plasticisers, extenders (sometimes referred to as processing aids), flame retardants, UV stabilizers, fungicides and/or biocides and the like. Many of these additives are solids i.e. particulate by nature or in the case of said fungicides and/or biocides, for example, may be encapsulated solids and/or liquids as described in US2010/0099793 and US2008/0033074.

The polydiorganosiloxanes having reactive terminal groups, e.g. hydroxy groups or hydrolysable groups, used in such condensation curable organosiloxane compositions are often of relatively high viscosity e.g. greater than 30,000 mPa·s at 25° C. and in some instances are gums having a viscosity of greater than 1,000,000 mPa·s at 25° C. and as such it can be very difficult, time consuming and labour intensive to introduce and thoroughly intermix said solids e.g. powders and/or particulates directly into such high viscosity fluids. Hence, many of the solid additives used in such compositions are provided to the user, in the form of additive concentrates, (sometimes referred to as masterbatches). By additive concentrate we mean the solid additive in question is provided to the user in a liquid carrier so that it is in a form which is much easier to introduce into condensation curable organosiloxane compositions than when in solid form.

For these additive concentrates to be fit for purpose, the aforementioned liquid carrier must be compatible with the ingredients of the condensation curable organosiloxane compositions into which they are to be introduced and as such favoured carriers include dialkylsilanol terminated polydiorganosiloxane polymers which are able to participate in the cure process or unreactive silicones and/or compatible organic materials, e.g. plasticisers or extenders, compatible with both the additive and the polymer of the condensation curable organosiloxane composition into which they are to be introduced. When the liquid carrier is a dialkylsilanol terminated polydiorganosiloxane polymer, it may be the same as the polymer being used in the condensation curable organosiloxane composition into which it is to be added or alternatively may have a similar structure but a lower viscosity. The carrier liquid may have a greater viscosity than the polymer in the condensation curable organosiloxane composition, but this is not preferred.

It has been identified that, when using dialkylsilanol terminated polydiorganosiloxane polymers as the liquid carrier, the pH of the additive can destabilize the liquid carrier as siloxane based components of the formulation are known to be sensitive to acidic or basic environments. It has also been identified that if the carrier liquid is destabilized, the destabilization can consequently negatively affect the stability of the condensation curable organosiloxane composition into which it is added and hence the performance of the final elastomer formed in negatively affected.

There is therefore a need to identify a means of stabilizing dialkylsilanol terminated polydiorganosiloxane polymers when being used as carrier liquids in additive concentrates for use in condensation curable organosiloxane compositions.

There is provided herein a process for stabilizing an additive concentrate suitable for use in condensation curable organosiloxane compositions by mixing
(i) A solid additive in an amount of from 25 to 80 weight % (wt. %) of the composition with
(ii) a liquid carrier comprising a dialkylsilanol terminated polydiorganosiloxane polymer in an amount of from 20 to 75 wt. % of the composition and
(iii) a stabilizer comprising or consisting of a polydialkylsiloxane having the general formula:

$$R^3_3\text{—Si—O—}((R^2)_2\text{SiO})_d\text{—Si—}R^3_3 \qquad (1)$$

where $R^2$ is an alkyl or phenyl group, each $R^3$ group may be the same or different and are selected from $R^2$, alkenyl or alkynyl groups and the average value of d is between 7 and 20, in an amount of from 0.5 to 5 wt. % of the composition.

There is also provided a stabilized additive concentrate suitable for use in condensation curable organosiloxane compositions obtained or obtainable by mixing
(i) a solid additive in an amount of from 25 to 80 wt. % of the composition with
(ii) a liquid carrier comprising a dialkylsilanol terminated polydiorganosiloxane polymer in an amount of from 20 to 75 wt. % of the composition with
(iii) a stabilizer comprising or consisting of a polydialkylsiloxane having the general formula:

$$R^3_3\text{—Si—O—}((R^2)_2\text{SiO})_d\text{—Si—}R^3_3$$

where $R^2$ is an alkyl or phenyl group, each $R^3$ group may be the same or different and are selected from $R^2$, alkenyl or alkynyl groups and the average value of d is between 7 and 20, in an amount of from 0.5 to 5 wt. % of the composition.

There is also provided herein a process for preparing a condensation curable organosiloxane composition by mixing the following
(a) a polydiorganosiloxane having at least two hydroxy groups or hydrolysable groups per molecule,
(b) one or more silane or siloxane cross-linkers reactive with the at least two hydroxy groups or hydrolysable groups of polydiorganosiloxane (a),
(c) a condensation cure catalyst,
(d) one or more reinforcing fillers or semi-reinforcing fillers, and
(e) at least one stabilized additive concentrate prepared in accordance with the process as hereinbefore described.

There is provided herein a condensation curable organosiloxane composition obtained or obtainable by mixing the following
(a) a polydiorganosiloxane having at least two hydroxy groups or hydrolysable groups per molecule,
(b) one or more silane or siloxane cross-linkers reactive with the at least two hydroxy groups or hydrolysable groups of polydiorganosiloxane (a),
(c) a condensation cure catalyst,
(d) one or more reinforcing fillers or semi-reinforcing fillers, and
(e) at least one stabilized additive concentrate prepared in accordance with the process as hereinbefore described.

There is further provided a use of a stabilized additive concentrate as hereinbefore described as an ingredient in a condensation curable organosiloxane composition.

The solid additive (i) of the stabilized additive concentrate may be selected from any solid additive utilised in a condensation curable organosiloxane composition other than component (d) the one or more reinforcing fillers or semi-reinforcing fillers used in the aforementioned condensation curable organosiloxane composition discussed further below. For example, non-reinforcing fillers, electrically conducting fillers, heat conducting fillers, pigments, co-catalysts; heat stabilizing agents, flame retardants, UV stabilizers, fungicides and/or biocides and encapsulated liquids such as encapsulated fungicides and/or biocides. In one embodiment the solid additive utilised in a condensation curable organosiloxane composition is a pigment and/or heat stabilizing agent.

In one embodiment the additive (i) causes solutions, into which it is added, to have an acidic pH, i.e. a pH of less than (<) 7, in accordance with general knowledge, measurement taken using a standard digital pH meter in aqueous solutions and/or from supplier data; alternatively a pH of less than or equal to ($\le$) 6, alternatively a pH of less than 6.

Non-reinforcing fillers may comprise non-reinforcing fillers such as crushed quartz, diatomaceous earths, barium sulphate, iron oxide, titanium dioxide and carbon black, talc. Other fillers which might be used alone or in addition to the above include aluminite, calcium sulphate (anhydrite), gypsum, calcium sulphate, magnesium carbonate, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Other non-reinforcing fillers may include aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2SiO_3O_{12}$. Aluminosilicates comprise ground silicate minerals, such as but not limited to, sillimanite; $Al_2SiO_5$; mullite; $3Al_2O_3 \cdot 2SiO_2$; kyanite; and $Al_2SiO_5$.

The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite. The optional non-reinforcing filler, when present, is present in an amount up to 20 wt. % of the stabilized additive concentrate composition.

If desired the non-reinforcing filler may be hydrophobically treated with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components.

The additive (i) of the stabilized additive concentrate may alternatively or additionally be one or more electrically conducting fillers, Examples of electrically conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

The additive (i) of the stabilized additive concentrate may alternatively or additionally be one or more heat conducting fillers, Examples of thermally conductive fillers include boron nitride, alumina, metal oxides (such as zinc oxide, magnesium oxide, aluminium oxide), graphite, diamond, and mixtures or derivatives thereof.

The additive (i) of the stabilized additive concentrate may alternatively or additionally be one or more pigments. Pigments are utilized to color the composition as required. Any suitable pigment may be utilized providing it is compatible with the composition. These may include iron oxides e.g. yellow iron oxide, red iron oxide, black iron oxide; carbon black titanium dioxide, chromium oxide, bismuth vanadium oxide and mixtures or derivatives thereof.

The additive (i) of the stabilized additive concentrate may alternatively or additionally be one or more suitable heat stabilizing agents. These may include iron oxides e.g. yellow iron oxide, red iron oxide, black iron oxide; zinc oxide, carbon black cerium oxide, cerium hydroxide and/or titanium dioxide.

It will be appreciated that several of the additives listed under non-reinforcing fillers, pigments and heat stabilizing agents appear in two or more lists and will function as all three if present in sufficient amounts. Such additives e.g. carbon black or iron oxide may be present in a range of from 1 to 30 wt. % of the of the stabilized additive concentrate composition, alternatively from 1 to 20 wt. % of the of the stabilized additive concentrate composition. In the event they are desired to function merely as a pigment then they will only need to be present in the composition in an amount of about 1 to 5 wt. % of the stabilized additive concentrate composition but if they are desired to also function as a non-reinforcing filler and/or as a heat stabilizing agent they will usually be present in a larger amount such as from 10 to 30 wt. % of the stabilized additive concentrate composition.

The additive (i) of the stabilized additive concentrate may alternatively or additionally include solid flame retardants such as aluminium trihydrate, hexabromocyclododecane, triphenyl phosphate, and mixtures or derivatives thereof.

The additive (i) of the stabilized additive concentrate may alternatively or additionally include solid or encapsulated UV stabilizers, such as benzotriazole. Additionally, additives may include solid fungicides and/or biocides and encapsulated liquids such as encapsulated fungicides and/or biocides.

The additive (i) of the stabilized additive concentrate may alternatively or additionally include solid or encapsulated biocides may additionally be utilized in the composition if required. It is intended that the term "biocides" includes bactericides, fungicides and algicides, and the like. Suitable examples of useful biocides, which may be utilized in compositions as described herein, include, for the sake of example:
Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole. Liquid biocides may suitably be present in an encapsulated form as described in US2010/0099793 and US2008/0033074.

The liquid carrier (ii) of the stabilized additive concentrates described herein is a dialkylsilanol terminated polydiorganosiloxane polymer and may have the structure

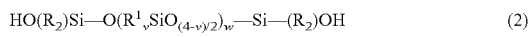
$$HO(R_2)Si-O(R^1_v SiO_{(4-v)/2})_w-Si-(R_2)OH \quad (2)$$

in which each R is an alkyl, alkenyl or aryl group; each $R^1$ may be the same or different and is a hydroxyl group, hydrolysable group, alkyl group, alkenyl group or aryl group;

v is 0, 1 or 2, and w is an integer such that said dialkylsilanol terminated polydiorganosiloxane has a viscosity of from 5,000 to 50,000 mPa·s at 25° C., alternatively from 5,000 to 30,000 mPa·s at 25° C., alternatively from 5,000 to 25,000 mPa·s at 25° C. measured using a Brookfield® rotational viscometer with spindle LV-4 (designed for viscosities in the range between 1,000-2,000,000 mPa·s) adapting the speed according to the polymer viscosity.

The term "hydrolyzable group" means any group attached to the silicon which is hydrolyzed by water at room temperature. The hydrolyzable group includes groups of the formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —(CH$_2$CH$_2$O)$_2$CH$_3$.

The most preferred hydrolyzable group are alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy.

Each R is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups, alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, e.g. phenyl.

Each $R^1$ may be the same or different and is a hydroxyl group, hydrolysable group, alkyl group, alkenyl group or aryl group. It is possible that some $R^1$ groups may be siloxane branches off the polymer backbone which branches may have terminal groups as hereinbefore described. Most preferred $R^1$ is methyl, phenyl or a mixture of methyl and phenyl groups.

Liquid carrier (ii) of the stabilized additive concentrate can be a single dialkylsilanol terminated polydiorganosiloxane represented by Formula (2) or it can be a mixture of organopolysiloxane polymers represented by the aforesaid formula. Hence, the term "siloxane polymer mixture" in respect to liquid carrier (ii) is meant to include any individual dialkylsilanol terminated polydiorganosiloxane or mixtures of dialkylsilanol terminated polydiorganosiloxanes.

The Degree of Polymerization (DP), (i.e. in the above formula substantially subscript w), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity.

Liquid carrier (ii) is present in the stabilized additive concentrate composition in an amount of from 20 to 75 wt. % of the composition 20 to 60 wt. %, alternatively 20 to 55%, alternatively 20 to 50 wt. % of the composition.

The stabilizer (iii) of the stabilized additive concentrate comprises or consists of one or more polydiorganosiloxanes having the general formula:

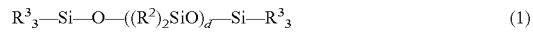
$$R^3_3-Si-O-((R^2)_2SiO)_d-Si-R^3_3 \quad (1)$$

where $R^2$ is an alkyl or phenyl group and each $R^3$ group may be the same or different and are selected from $R^2$ alkenyl or alkynyl groups and the average value of d is between 7 and 20, in an amount of from 0.5 to 5 wt. % of the composition.

In one alternative $R^2$ is an alkyl group, alternatively alkyl groups having from 1 to 10 carbon atoms, alternatively from 1 to 6 carbon atoms, alternatively 1 to 4 carbon atoms, alternatively methyl or ethyl groups. Each $R^3$ group may be the same or different and are selected from R² alkenyl or alkynyl groups when R³ is an alkenyl group, the alkenyl group may have from 2 to 10 carbon atoms, alternatively from 2 to 6 carbon atoms, such as vinyl, allyl and hexenyl groups. Preferably each R² is an alkyl group, e.g. methyl or ethyl and each R³ is an alkyl group, e.g. methyl or ethyl or a phenyl group, alternatively a methyl group. In the one or more polydiorganosiloxanes of stabilizer (iii) preferably the average value of d polydiorganosiloxane general formula above is between 7 and 20, alternatively between 7 and 15.

A specific example of an additive concentrate herein is where an iron oxide e.g. red iron oxide, is additive (i) and is being utilised as a heat stabilizing agent and pigment. Different types of iron oxide are used as pigments in many polymeric systems. They may provide, yellow, orange, red, brown, black and even blue colorations. Typically, when used as pigments they may be present in the composition in amounts of up to 10 wt. % of condensation curable organosiloxane compositions. When provided in greater amounts e.g. in amounts of from 10 to 25 wt. % of the condensation curable organosiloxane composition, iron oxide functions not only as a pigment but also as a heat stabilizing agent. However, the acidity of iron oxide can vary dependent on the type being used and the production methods used for their manufacture. It has been identified that where the iron oxide exhibits a pH<6, if supplied as an additive concentrate in hydroxyl functional polydimethylsiloxane components e.g., in the form of a dispersion, the hydroxyl functional poly dimethyl siloxane component can degrade or undergo condensation during storage before introduction into condensation curable organosiloxane compositions as an additive concentrate.

It has been identified that if from 1 to 5 wt. % of stabilizer (iii) described above is introduced into the additive concentrate otherwise containing iron oxide having a pH of <6 as component (i) and liquid carrier (ii), the liquid carrier (ii) as described above is stabilized and the acidic iron oxide, even at high loadings, does not appear to have any detrimental effect on the liquid carrier (ii) or ultimately the final elastomer performance. This is surprising because often larger amounts of stabilizer (iii) may be introduced into the condensation curable organosiloxane composition as a plasticiser, but the stabilization affect does not occur unless a small amount of stabilizer (iii) is introduced into the additive concentrate before its introduction into the condensation curable organosiloxane composition. Introducing an iron oxide additive concentrate, without stabilizer (iii) therein, into the condensation curable organosiloxane composition, even when amounts of stabilizer (iii) have been introduced separately into the condensation curable organosiloxane composition as a plasticiser surprisingly does not result in the stabilization effect.

Indeed, when the pH of the iron oxide was less than (<) 6, the carrier liquid (ii) of the additive concentrate was de-stabilized when stabilizer (iii) is not introduced. It was also noted that in such cases the final elastomer is also negatively affected e.g. due to unacceptable softening of the final elastomer making it unsuitable for use in the desired high temperature applications.

As previously discussed the present disclosure also discloses a process for making a condensation curable organosiloxane composition by mixing the following
(a) a polydiorganosiloxane having at least two hydroxy groups or hydrolysable groups per molecule,
(b) one or more silane or siloxane cross-linkers reactive with the at least two hydroxy groups or hydrolysable groups of polydiorganosiloxane (a),
(c) a condensation cure catalyst
(d) one or more reinforcing fillers or semi-reinforcing fillers;
together with at least one additive concentrate (e) prepared as hereinbefore described.

The polydiorganosiloxane having at least two hydroxy groups or hydrolysable groups per molecule (a) may have the formula

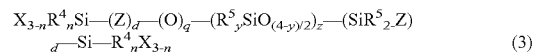

$$X_{3-n}R^4{}_n Si-(Z)_d-(O)_q-(R^5{}_y SiO_{(4-y)/2})_z-(SiR^5{}_2 Z)_d-Si-R^4{}_n X_{3-n} \quad (3)$$

in which each X is independently a hydroxyl group or a hydrolysable group, each R⁴ is an alkyl, alkenyl or aryl group, each R⁵ is an X group, alkyl group, alkenyl group or aryl group and Z is a divalent organic group;
d is 0 or 1, q is 0 or 1 and d+q=1; n is 0, 1, 2 or 3, y is 0, 1 or 2, and z is an integer such that said polydiorganosiloxane having at least two hydroxy groups or hydrolysable groups per molecule (a) has a viscosity of from 10,000 to 75,000 mPa·s at 25° C., alternatively from 10,000 to 60,000 mPa·s at 25° C. measured using a Brookfield® rotational viscometer with spindle LV-4 (designed for viscosities in the range between 1,000-2,000,000 mPa·s) adapting the speed according to the polymer viscosity.

Each X group of polydiorganosiloxane having at least two hydroxy groups or hydrolysable groups per molecule (a) may be the same or different and can be a hydroxyl group or a condensable or hydrolyzable group. The term "hydrolyzable group" means any group attached to the silicon which is hydrolyzed by water at room temperature. The hydrolyzable group X includes groups of the formula —OT, where T is also as previously described.

The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy.

Each R⁴ is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups, alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, substituted aliphatic organic groups such as 3,3,3-trifluoropropyl groups aminoalkyl groups, polyaminoalkyl groups, and/or epoxyalkyl groups.

Each R⁵ is individually selected from the group consisting of X or R with the proviso that cumulatively at least two X groups and/or R¹ groups per molecule are hydroxyl or hydrolysable groups. It is possible that some R⁵ groups may be siloxane branches off the polymer backbone which branches may have terminal groups as hereinbefore described. Most preferred R⁵ is methyl.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms. Each alkylene group may for example be individually selected from an ethylene, propylene, butylene, pentylene and/or hexylene group.

The polydiorganosiloxane having at least two hydroxy groups or hydrolysable groups per molecule (a) has a viscosity of from 10,000 to 75,000 mPa·s at 25° C., alternatively from 10,000 to 60,000 mPa·s at 25° C., z is therefore an integer enabling such a viscosity, alternatively z is an integer from 300 to 5000. Whilst y is 0, 1 or 2, substantially y=2, e.g. at least 90%, alternatively 95% of $R^4_y SiO_{(4-y)/2}$ groups are characterized with y=2.

Polydiorganosiloxane having at least two hydroxy groups or hydrolysable groups per molecule (a) can be a single siloxane represented by Formula (3) or it can be mixtures of organopolysiloxane polymers represented by the aforesaid formula. Hence, the term "siloxane polymer mixture" in respect to polydiorganosiloxane having at least two hydroxy groups or hydrolysable groups per molecule (a) is meant to include any individual polydiorganosiloxane having at least two hydroxy groups or hydrolysable groups per molecule (a) or mixtures of polydiorganosiloxane having at least two hydroxy groups or hydrolysable groups per molecule (a).

The Degree of Polymerization (DP), (i.e. in the above formula of the polydiorganosiloxane having at least two hydroxy groups or hydrolysable groups per molecule (a) substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity.

It will be appreciated that if d is 0, q is 1, n is 1 or 2, alternatively n is 2 and each X is a hydroxyl group, the polydiorganosiloxane having at least two hydroxy groups or hydrolysable groups per molecule (a) has the following structure:

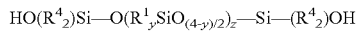

$$HO(R^4_2)Si—O(R^1_y SiO_{(4-y)/2})_z—Si—(R^4_2)OH$$

with $R^4$, $R^5$, Z, y and z being as described above. In such a case, the polydiorganosiloxane having at least two hydroxy groups or hydrolysable groups per molecule (a) and the liquid carrier (ii) described above may have the same chemical structure, although the degree of polymerisation and value of z of the polydiorganosiloxane having at least two hydroxy groups or hydrolysable groups per molecule (a) is usually greater than or equal to the degree of polymerisation and value w in the liquid carrier.

Polydiorganosiloxane having at least two hydroxy groups or hydrolysable groups per molecule (a) is present in the condensation curable organosiloxane composition in an amount of from 10 to 60 wt. %, alternatively 10 to 55%, alternatively 20 to 55 wt. % of the condensation curable organosiloxane composition.

The condensation curable organosiloxane composition also comprises cross-linker (b). Any suitable cross-linker having at least two, preferably at least three groups per molecule which are reactable with the hydroxyl or hydrolysable groups of polydiorganosiloxane having at least two hydroxy groups or hydrolysable groups per molecule (a) may be utilised. Typically, cross-linker (b) comprises one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, isobutoxy and propoxy) and alkenyloxy groups (for example isopropenyloxy and 1-ethyl-2-methylvinyloxy).

Cross-linker (b) may comprise siloxane based cross-linkers having a straight chained, branched, or cyclic molecular structure.

Cross-linker (b) has at least two, preferably at least three or four hydroxyl and/or hydrolysable groups per molecule which are reactive with the hydroxyl and/or hydrolysable groups in polydiorganosiloxane having at least two hydroxy groups or hydrolysable groups per molecule (a). When cross-linker (b) is required to be added, the cross-linker (b) may alternatively be a silane and when the silane has a total of three silicon-bonded hydroxyl and/or hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Silanes and siloxanes which can be used as cross-linker (b) include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyltripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate and/or dimethyltetraacetoxydisiloxane. Cross-linker (b) may alternatively comprise any combination of two or more of the above.

Alternatively, cross-linker (b) may comprise a silyl functional molecule containing two or more silyl groups, each silyl group containing at least one —OH or hydrolysable group, the total of number of —OH groups and/or hydrolysable groups per cross-linker molecule being at least 3. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain having a siloxane or organic polymeric backbone. In the case of such siloxane or organic based cross-linkers (b) the molecular structure can be straight chained, branched, cyclic or macromolecular. In the case of siloxane-based polymers the viscosity of the cross-linker (b) will be within the range of from 15 mPa·s to 80,000 mPa·s at 25° C. using either a Brookfield® rotational viscometer with spindle LV-4 (designed for viscosities in the range between 1,000-2,000,000 mPa·s) or a Brookfield® rotational viscometer with spindle LV-1 (designed for viscosities in the range between 15-20,000 mPa·s) for viscosities less than 1000 mPa·s and adapting the speed according to the polymer viscosity.

For example, if required to be added, cross-linker (b) may be a disilyl functional polymer, that is, a polymer containing two silyl groups, each having at least one hydrolysable group such as described by the formula

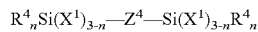

where each $R^4$, and n may be individually selected as hereinbefore described above. $Z^4$ is an alkylene (divalent hydrocarbon group), alternatively an alkylene group having from 1 to 10 carbon atoms, or further alternatively 1 to 6 carbon atoms or a combination of said divalent hydrocarbon groups and divalent siloxane groups.

Each $X^1$ group may be the same or different and can be a hydroxyl group or a condensable or hydrolyzable group. The term "hydrolyzable group" means any group attached to the silicon which is hydrolyzed by water at room temperature. The hydrolyzable group $X^1$ includes groups of the formula —$OT^1$, where $T^1$ is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —$(CH_2CH_2O)_2CH_3$. The most preferred $X^1$ groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy.

Preferred di-silyl functional polymer cross-linkers (b) have n=0 or 1, $X^1$=OMe and $Z^4$ being an alkylene group with 4 to 6 carbons (e.g. —$(CH_2)_4$—).

Examples of disilyl polymeric cross-linkers (b) with a silicone or organic polymer chain bearing alkoxy functional end groups include polydimethylsiloxanes having at least one trialkoxy terminal where the alkoxy group may be a methoxy or ethoxy group. Examples might include or 1,6-bis(trimethoxy silyl)hexane, hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane. In one embodiment the cross-linker (b) may be one or more of vinyltrimethoxysilane, methyltrimethoxysilane and/or vinylmethyldimethoxysilane.

The Condensation curable organosiloxane compositions suitably contain cross-linker (b) in at least a stoichiometric amount as compared to polydiorganosiloxane having at least two hydroxy groups or hydrolysable groups per molecule (a) described above. Hence, the amount present will also depend upon the particular nature of the cross-linker (b) utilised and in particular, the molecular weight of the molecule selected. The cross-linker (b) is therefore typically present in the composition in an amount of from 0.1 to 5 wt. % of the condensation curable organosiloxane composition but may potentially be present in a greater amount.

The condensation curable organosiloxane composition also comprises a condensation cure catalyst. The condensation cure catalyst may be a tin based catalyst. Any suitable tin catalyst may be utilised. Said tin catalyst, may comprise one or more of the following tin triflates, organic tin metal catalysts such as triethyltin tartrate, tin octoate, tin oleate, tin naphenthate, butyltintri-2-ethylhexoate, tinbutyrate, carbomethoxyphenyl tin trisuberate, isobutyltintriceroate, and diorganotin salts especially diorganotin dicarboxylate compounds such as dibutyltin dilaurate (DBTDL), dioctyltin dilaurate (DOTDL), dimethyltin dibutyrate, dibutyltin dimethoxide, dibutyltin diacetate (DBTDA), dibutyltin bis(2,4-pentanedionate), dibutyltin dibenzoate, stannous octoate, dimethyltin dineodecanoate (DMTDN) dioctyltin dineodecanoate (DOTDN) and dibutyltin dioctoate.

Alternatively or additionally the condensation cure catalyst (c) may comprise a titanate and/or zirconate based catalyst e.g. according to the general formula Ti[$OR^{22}$]$_4$ or Zr[$OR^{22}$]$_4$ where each $R^{22}$ may be the same or different and represents a monovalent, primary, secondary or tertiary aliphatic hydrocarbon group which may be linear or branched containing from 1 to 10 carbon atoms. Optionally the titanate and/or zirconate may contain partially unsaturated groups. Examples of $R^{22}$ include but are not restricted to methyl, ethyl, propyl, isopropyl, butyl, tertiary butyl and a branched secondary alkyl group such as 2, 4-dimethyl-3-pentyl. Alternatively, when each $R^{22}$ is the same, $R^{22}$ is an isopropyl, branched secondary alkyl group or a tertiary alkyl group, in particular, tertiary butyl. In one alternative the catalyst is a titanate. Suitable titanate examples include tetra n-butyl titanate, tetra t-butyl titanate, titanium tetrabutoxide and tetraisopropyl titanate. Suitable zirconate examples include tetra-n-propyl zirconate, tetra-n-butyl zirconate and zirconium diethylcitrate.

Alternatively, the titanate and/or zirconate may be chelated. The chelation may be with any suitable chelating agent such as an alkyl acetylacetonate such as methyl or ethyl acetylacetonate. Alternatively, the titanate may be monoalkoxy titanates bearing three chelating agents such as for example 2-propanolato, tris isooctadecanoato titanate or Diisopropoxy-bisethylacetoacetatotitanate.

Condensation cure catalyst (c) is typically present in the composition in an amount of from 0.25 to 4.0 wt. % of the composition, alternatively from 0.25 to 3 wt. % of the condensation curable organosiloxane compositions, alternatively from 0.3% to 2.5 wt. % of the composition.

The one or more reinforcing fillers or semi-reinforcing fillers (d) may comprise reinforcing filler and/or semi-reinforcing fillers, for example one or more of fumed silica, colloidal silica and/or precipitated silica, preferably provided in a finely divided form, and/or may include other fillers as desired such as precipitated calcium carbonate and ground calcium carbonate, kaolin and/or wollastonite. Typically, the surface area of the filler (d) is at least 15 m$^2$/g in the case of precipitated calcium carbonate measured in accordance with the BET method in accordance with ISO 9277: 2010, alternatively 15 to 50 m$^2$/g, alternatively, 15 to 25 m$^2$/g in the case of precipitated calcium carbonate. Silica reinforcing fillers have a typical surface area of at least 50 m$^2$/g. In one embodiment filler (d) is a precipitated calcium carbonate, precipitated silica and/or fumed silica; alternatively, precipitated calcium carbonate. In the case of high surface area fumed silica and/or high surface area precipitated silica, these may have surface areas of from 75 to 400 m$^2$/g measured using the BET method in accordance with ISO 9277: 2010, alternatively of from 100 to 300 m$^2$/g using the BET method in accordance with ISO 9277: 2010.

Typically, the reinforcing fillers (d) are present in the composition in an amount of from about 5 to 45 wt. % of the composition, alternatively from about 5 to 30 wt. % of the composition, alternatively from about 5 to 25 wt. % of the composition, depending on the chosen filler.

Filler (d) may be hydrophobically treated for example with one or more aliphatic acids, e.g. a fatty acid such as stearic acid or a fatty acid ester such as a stearate, or with organosilanes, organosiloxanes, or organosilazanes e.g. hexaalkyl disilazane or short chain siloxane diols to render the filler(s) (d) hydrophobic and therefore easier to handle and obtain a homogeneous mixture with the other adhesive components. The surface treatment of the fillers makes them easily wetted by the polydiorganosiloxane having at least two hydroxy groups or hydrolysable groups per molecule (a). These surface modified fillers do not clump and can be homogeneously incorporated into the polydiorganosiloxane having at least two hydroxy groups or hydrolysable groups per molecule (a). This results in improved room temperature mechanical properties of the uncured compositions. The fillers may be pre-treated or may be treated in situ when being mixed with polydiorganosiloxane having at least two hydroxy groups or hydrolysable groups per molecule (a).

The condensation curable organosiloxane composition as hereinbefore described must be prepared by introducing at least one additive concentrate (e). Each additive concentrate (e) comprises an additive concentrate prepared, as described above by mixing
(i) an additive in an amount of from 25 to 80 wt. % of the composition with
(ii) a liquid carrier comprising a dialkylsilanol terminated polydiorganosiloxane polymer in an amount of from 20 to 75 wt. % of the composition in the presence of
(iii) a stabilizer comprising or consisting of a polydialkylsiloxane having the general formula:

$$R^3_3-Si-O-((R^2)_2SiO)_d-Si-R^3_3$$

where $R^2$ is an alkyl or phenyl group, each $R^3$ group may be the same or different and are selected from $R^2$ alkenyl or alkynyl groups and the average value of d is between 7 and 20, in an amount of from 0.5 to 5 wt. % of the composition.

Liquid additives or other solid additives may, if desired, be added into the condensation curable organosiloxane composition. These may include one or more of, for the sake of example, pigments, dyes, co-catalysts; scavengers, rheological modifiers; adhesion promoters, heat stabilizing agents, plasticisers, extenders (sometimes referred to as processing aids), flame retardants, UV stabilizers, fungicides and/or biocides and the like. These includes additives which have been previously described as well as other additives. The other additives may include liquids and/or other additives not suited for addition in the form of a liquid concentrate (e).

Other additives may include liquids not usually introduced in the form of liquid concentrates dyes, rheological modifiers; chain extenders, adhesion promoters, plasticisers, extenders (sometimes referred to as processing aids) and/or biocides and/or fungicides.

Rheology modifiers which may be incorporated in condensation curable compositions according to the invention include silicone organic co-polymers such as those described in EP0802233 based on polyols of polyethers or polyesters; waxes such as polyamide waxes, non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion to substrates, particularly plastic substrates.

Furthermore, if desired, prior to or even concurrently with the process hereinbefore described, chain-extenders may be introduced to extend the length of the polymer chain. The chain-extenders, may, for the sake of example, be difunctional silanes. Suitable difunctional silanes may have the following structure $$(R^{11})_2-Si-(R^{12})_2$$

Wherein each $R^{11}$ may be the same or different and may be linear, branched or cyclic but is a non-functional group, in that it is unreactive with the —OH groups or hydrolysable groups of polydiorganosiloxane polymer (a). Hence, each $R^{11}$ group is selected from an alkyl group having from 1 to 10 carbon atoms, an alkenyl group, an alkynyl group or an aryl group such as phenyl. In one alternative the $R^{11}$ groups are either alkyl groups or alkenyl groups, alternatively there may be one alkyl group and one alkenyl group per molecule. The alkenyl group may for example be selected from a linear or branched alkenyl groups such as vinyl, propenyl and hexenyl groups and the alkyl group has from 1 to 10 carbon atoms, such as methyl, ethyl or isopropyl. In a further alternative $R^{11}$ may be replaced by $R^{111}$ which is cyclic and bonds to the Si atom in two places.

Each group $R^{12}$ may be the same or different and is reactable with the hydroxyl or hydrolysable groups. Examples of group $R^{12}$ include alkoxy, acetoxy, oxime, hydroxy and/or acetamide groups. Alternatively, each $R^{12}$ is either an alkoxy group or an acetamide group. When $R^{12}$ is an alkoxy group, said alkoxy groups containing between 1 and 10 carbon atoms, for example methoxy, ethoxy, propoxy, isoproproxy, butoxy, and t-butoxy groups. Specific examples of suitable chain-extenders include, alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, vinyl methyldiacetoxysilane, vinylethyldiacetoxysilane and alkenylalkyldihydroxysilanes such as vinyl methyl dihydroxysilane, vinyl ethyldihydroxysilane, vinyl methyldihydroxysilane and vinylethyldihydroxysilane.

When $R^{12}$ is an acetamide the disilane may be a dialkyldiacetamidosilane or an alkylalkenyldiacetamidosilane. Such diacetamidosilanes are known chain-extending materials for low modulus sealant formulations as described in for example U.S. Pat. Nos. 5,017,628 and 3,996,184. The diacetamidosilanes may for example have the structure $$CH_3-C(=O)-NR^{13}-Si(R^{14})_2-NR^{13}-C(=O)-CH_3$$

wherein each $R^{13}$ may be the same or different and may be the same as R as defined above, alternatively, each $R^{13}$ may be the same or different and may comprise an alkyl group having from 1 to 6 carbons, alternatively 1 to 4 carbons. Each $R^{14}$ may also be the same or different and may also be the same as R as defined above comprise an alkyl group having from 1 to 6 carbons, alternatively 1 to 4 carbons or an alkenyl group having from 2 to 6 carbons, alternatively 2 to 4 carbons, alternatively vinyl.

In use the diacetamidosilanes may be selected from one or more of the following:
N,N'-(dimethylsilylene)bis[N-methylacetamide]

N,N'-(dimethylsilylene)bis[N-ethylacetamide]
N,N'-(diethylsilylene)bis[N-methylacetamide]
N,N'-(diethylsilylene)bis[N-ethylacetamide]
N,N'-(dimethylsilylene)bis[N-propylacetamide]
N,N'-(diethylsilylene)bis[N-propylacetamide]
N,N'-(dipropylsilylene)bis[N-methylacetamide]
N,N'-(dipropylsilylene)bis[N-ethylacetamide]
N,N'-(methylvinylsilylene)bis[N-ethylacetamide]
N,N'-(ethylvinylsilylene)bis[N-ethylacetamide]
N,N'-(propylvinylsilylene)bis[N-ethylacetamide]
N,N'-(methylvinylsilylene)bis[N-methylacetamide]
N,N'-(ethylvinylsilylene)bis[N-methylacetamide] and/or
N,N'-(propylvinylsilylene)bis[N-methylacetamide].

Alternatively, the dialkyldiacetamidosilane may be a dialkyldiacetamidosilane selected from N,N'-(dimethylsilylene)bis[N-ethylacetamide] and/or N,N'-(dimethylsilylene)bis[N-methylacetamide].

Alternatively, the dialkyldiacetamidosilane is N,N'-(dimethylsilylene)bis[N-ethylacetamide].

When present, the chain-extenders are present in an amount of from 0.01 to 5 wt. % of the composition, alternatively 0.05 to 1 wt. %.

A further liquid additive which may be utilised in the condensation curable organosiloxane composition is an adhesion promoter. Suitable adhesion promoters may comprise alkoxysilanes of the formula $R^{14}_h Si(OR^{15})_{(4-h)}$, where subscript h is 1, 2, or 3, alternatively h is 3. Each $R^{14}$ is independently a monovalent organofunctional group. $R^{14}$ can be an epoxy functional group such as glycidoxypropyl or (epoxycyclohexyl)ethyl, an amino functional group such as aminoethylaminopropyl or aminopropyl, a methacryloxypropyl, a mercapto functional group such as mercaptopropyl or an unsaturated organic group. Each $R^{15}$ is independently an unsubstituted, saturated hydrocarbon group of at least 1 carbon atom. $R^{15}$ may have 1 to 4 carbon atoms, alternatively 1 to 2 carbon atoms. $R^{15}$ is exemplified by methyl, ethyl, n-propyl, and iso-propyl.

Alternatively the adhesion promoter may be glycidoxypropyltrimethoxysilane or a multifunctional material obtained by reacting two or more of the above. For examples the reaction product of an alkylalkoxysilicone e.g. trimethoxymethylsilane; an aminoalkoxysilane, e.g. 3-aminopropyl trimethoxysilane and an epoxyalkoxysilane e.g. glycidoxypropyl trimethoxysilane; in a weight ratio of (i):(ii):(iii) of 0.1-6:0.1-5:1.

Examples of suitable adhesion promoters may also include and molecules of the structure

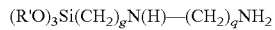

$(R'O)_3Si(CH_2)_gN(H)—(CH_2)_qNH_2$ in which each R' may be the same or different and is an alkyl group containing from 1 to 10 carbon atoms, g is from 2 to 10 and q is from 2 to 10.

The condensation curable organosiloxane composition may comprise, when present, 0.01 wt. % to 2 wt. %, alternatively 0.05 to 2 wt. %, alternatively 0.1 to 1 wt. % of adhesion promoter based on the weight of the composition. Preferably, the speed of hydrolysis of the adhesion promoter should be lower than the speed of hydrolysis of the cross-linker in order to favour diffusion of the molecule towards the substrate rather than its incorporation in the product network.

Any suitable —OH (moisture/water/alcohol) scavenger may be used in the condensation curable organosiloxane composition if required, for example orthoformic acid esters, molecular sieves, silazanes e.g. organosilazanes hexaalkyl disilazane, e.g. hexamethyldisilazane and/or one or more silanes of the structure

$R^{20}_j Si(OR^{21})_{4-j}$ where each $R^{21}$ may be the same or different and is an alkyl group containing at least 2 carbon atoms;

j is 1 or 0; and $R^{20}$ is a silicon-bonded organic group selected from a substituted or unsubstituted straight or branched monovalent hydrocarbon group having at least 2 carbons, a cycloalkyl group, an aryl group, an aralkyl group or any one of the foregoing wherein at least one hydrogen atom bonded to carbon is substituted by a halogen atom, or an organic group having an epoxy group, a glycidyl group, an acyl group, a carboxyl group, an ester group, an amino group, an amide group, a (meth)acryl group, a mercapto group or an isocyanate group. When present the scavenger is typically introduced into the condensation curable organosiloxane composition in an amount in a range of from 0.5 to 3.0 wt. % of the total wt. % composition, however the amount may be more. Such scavengers tend to be used when the polymer has end-capping hydrolysable groups e.g. alkoxy groups to stabilize the polymer and condensation curable organosiloxane composition during storage. dependent on the amounts of alcoholic by-products being generated and the process being used to generate them.

Plasticisers and/or extenders (sometimes identified as processing aids)

Any suitable plasticiser or extender may be used if desired. These may be any of the plasticisers or extenders identified in GB2445821, incorporated herein by reference. When used the plasticiser or extender may be added before, after or during the preparation of the polymer, However, it does not contribute to or participate in the polymerisation process.

Examples of plasticisers or extenders include silicon containing liquids such as hexamethyldisiloxane, octamethyltrisiloxane, and other short chain linear siloxanes such as octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)} trisiloxane, cyclic siloxanes such as hexamethylcyclotrisiloxane, octamethylcyclotetrasiloxane, decamethylcyclopentasiloxane, dodecamethylcyclohexasiloxane; further polydiorganosiloxanes, optionally including aryl functional siloxanes, having a viscosity of from 0.5 to 12,500 mPa·s, measured at 25° C.; using Glass Capillary Viscometer (ASTM D-445, IP 71) for 0.5 to 1000 mPa·s and a Brookfield® rotational viscometer with spindle LV-1 (designed for viscosities in the range between 15-20,000 mPa·s) for viscosities greater than 1000 mPa·s and adapting the speed according to the polymer viscosity.

It will be appreciated that the stabilizer (iii) of the additive concentrate described above may be the same as a short chain linear siloxane added directly into the condensation curable organosiloxane composition as a plasticiser. Hence, it will be appreciated that stabilizer (iii) of the additive concentrate may partially function as a plasticiser in the condensation curable organosiloxane composition but as previously discussed, surprisingly it only stabilizes the additive concentrate if added directly into the additive concentrate. Typically, if a short chain siloxane is required to function as a plasticiser in the current composition there will be short chain linear siloxane added directly into the condensation curable organosiloxane composition in addition to stabilizer (iii).

Alternatively, the plasticisers or extenders may include organic liquids such as butyl acetate, alkanes, alcohols, ketones, esters, ethers, glycols, glycol ethers, hydrocarbons, hydrofluorocarbons or any other material which can dilute the composition without adversely affecting any of the component materials. Hydrocarbons include isododecane, isohexadecane, Isopar™ L (C11-C13), Isopar™ H (C11-C12), hydrogenated polydecene, mineral oil, especially hydrogenated mineral oil or white oil, liquid polyisobutene, isoparaffinic oil or petroleum jelly. Ethers and esters include isodecyl neopentanoate, neopentylglycol heptanoate, glycol distearate, dicaprylyl carbonate, diethylhexyl carbonate, propylene glycol n butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, and octyl palmitate. Additional organic diluents include fats, oils, fatty acids, and fatty alcohols. A mixture of diluents may also be used.

The condensation curable organosiloxane composition as hereinbefore described may be stored prior to use in a one part composition or in a multiple part, typically two part composition. Generally, the one-part compositions are catalysed using titanate or zirconate catalysts and two-part compositions are prepared when other catalysts, typically tin based catalysts are being utilised. Zirconate and especially titanate catalysts have been widely described for their use in skin or diffusion cured one-part condensation curing silicone elastomers. These formulations are typically available in one-part packages that are applied in a layer that is thinner than 15 mm. Skin or diffusion cure (e.g. moisture/condensation) takes place when the initial cure process occurs by the formation of a cured skin at the composition/air interface subsequent to the sealant/encapsulant being applied on to a substrate surface. Subsequent to the generation of the surface skin the cure speed is dependent on the speed of diffusion of moisture from the sealant/encapsulant interface with air to the inside (or core), and the diffusion of condensation reaction by-product/effluent from the inside (or core) to the outside (or surface) of the material and the gradual thickening of the cured skin over time from the outside/surface to the inside/core. In the case of one-part compositions all the ingredients of the composition are mixed together before storage and can be used immediately by applying the sealant as and when required onto a suitable target.

Multi component compositions designed to activate condensation cure in the bulk of the product generally use other metal catalysts mainly tin-based catalysts In silicone compositions stored before use in two or more parts, one part contains a filler which typically contains the moisture required to activate condensation cure in the bulk of the product. Unlike the previously mentioned diffusion cure one-part system, two-part condensation cure systems, once mixed together, enable bulk cure even in sections greater than 15 mm in depth. In this case the composition will cure (subsequent to mixing) throughout the material bulk.

Critically to avoid pre-cure in storage:
component (a) the polydiorganosiloxane having at least two hydroxy groups or hydrolysable groups per molecule,
component (b) the one or more silane or siloxane cross-linkers reactive with the at least two hydroxy groups or hydrolysable groups of polydiorganosiloxane, and
component (c) the condensation cure catalyst, are not all stored in the same part.

In the case of two-part compositions, they are usually split into two parts often referred to as Part A (sometimes referred to as the base part) and Part B (sometimes referred to as the catalyst package).

Usually part A primarily consists of:
(a) a polydiorganosiloxane having at least two hydroxy groups or hydrolysable groups per molecule,
and
(d) one or more reinforcing fillers or semi-reinforcing fillers.

Part A, may also include (b) one or more silane or siloxane cross-linkers reactive with the at least two hydroxy groups or hydrolysable groups of polydiorganosiloxane (a), however if no component (a) is in the part B composition part then cross-linker (b) may alternatively be present in part B composition. Part A, usually contains the majority of the additives unless they are likely to affect the efficacy of one of the main components present therein. Hence, in the case of two-part compositions component (e) the additive concentrate is most likely to be added to the part A composition, but may, if desired, be added to the part B composition.

Part B may comprise Component (a) the polydiorganosiloxane having at least two hydroxy groups or hydrolysable groups per molecule, and component (c) the condensation cure catalyst and no component (b) cross-linker. However, alternatively providing component (a) is not present, the part B or the catalyst package composition may comprise cross-linker (b), catalyst (c) and optionally an unreactive silicone plasticiser as hereinbefore described which may, as previously discussed be the same as ingredient (iii) of the additive concentrate (e).

In the case of 2 part sealant compositions, the components of each part are mixed together in amounts within the ranges given above and then the part A composition and the part B composition are inter-mixed in a predetermined weight ratio e.g. from 15:1 to 1:1. If the intended mixing ratio of part A:part B is 15:1 or greater then no filler will be generally utilized in part B. However, if the intended mixing ratio of part A:part B is less than 15:1 an increasing amount filler will be utilized in the catalyst package up to the maximum of about 50 wt. % of part B if the intended ratio is 1:1. The condensation curable compositions can be prepared by mixing the ingredients employing any suitable mixing equipment.

Resulting compositions may be employed in a variety of applications, for example as coating, caulking, mold making and encapsulating materials for use with substrates such as glass, aluminium, stainless steel, painted metals, powder-coated metals, and the like. In particular, they are for use in construction and/or structural glazing and/or insulating glazing applications. For example, an insulating glass unit and/or building façade element e.g. a shadow box and/or structural glazing unit and/or a gas filled insulation construction panel, which in each case is sealed with a silicone sealant composition as hereinbefore described. Other potential applications include solar, automotive, electronics and industrial assembly and maintenance applications.

EXAMPLES

In the following examples, unless otherwise indicated, all viscosities mentioned were measured at 25° C. using either a Brookfield® rotational viscometer with spindle LV-4 (designed for viscosities in the range between 1,000-2,000,000 mPa·s) or a Brookfield® rotational viscometer with spindle LV-1 (designed for viscosities in the range between 15-20, 000 mPa·s) for viscosities less than 1000 mPa·s and adapting the speed according to the polymer viscosity.

A first series of experiments were undertaken comparing three additive concentrates, in which 55 wt % of a red iron oxide having a pH of 5.3 was utilised as the additive (i) and was mixed with 45 wt. % of a dimethylsilanol terminated polydimethylsiloxane having a viscosity of 2000 mPa·s at 25° C. (liquid carrier (ii)). Once thoroughly mixed, no stabilizer was added in comp. 1; magnesium oxide was added as a stabilizer in an amount equal to 1 wt. % of the total weight of the additive (i) and liquid carrier (ii) in Comp. 2 and a trimethyl terminated polydimethylsiloxane of the average structure $$Me_3-Si-O-((Me)_2SiO)_9-Si-Me_3$$

i.e. an average degree of polymerisation (DP) of 11 was added as stabilizer in an amount equal to 1 wt. % of the total weight of the additive (i) and liquid carrier (ii) in Ex. 1. The viscosity of samples of each of Comp. 1, Comp. 2 and Ex. 1 were determined without aging or were aged for a variety of periods of time in an accelerated aging study thereof. All viscosity measurements for these tests were carried out using an AR 2000EX Rheometer sold commercially by TA Instruments of New Castle, DE, USA with a 20 mm Steel plate and measurements were taken at shear rate of 10 s$^{-1}$, at a plate temperature of 50° C. The results are provided in Table 1 below.

TABLE 1

Accelerated aging study of Additive concentrates (Pa · s)

| Storage Conditions | Comp. 1 | Comp. 2 | Ex. 1 |
|---|---|---|---|
| 50° C. 0 days | 47 | 52 | 36 |
| 50° C. 7 days | 94 | 82 | 66 |
| 50° C. 14 days | 107 | 83 | 80 |
| 50° C. 21 days | 116 | 115 | 85 |
| 50° C. 28 days | 133 | 119 | 97 |

It can be noted from the accelerated aging study above that the addition of trimethyl terminated polydimethylsiloxane (iii) to the iron oxide (i) and carrier fluid (ii) mixture in Ex. 1 resulted in a much slower increase in viscosity with aging than either Comp. 1 (no stabilizer) or Comp. 2 (known acid acceptor MgO added as stabilizer). This indicated that the carrier fluid is less prone to condensation in the presence of the acidic iron oxide when the trimethyl terminated polydimethylsiloxane is included in the formulation. Thus, the trimethyl terminated polydimethylsiloxane is shown to inhibit this condensation reaction (known to increase viscosity) and stabilize the solution to a greater degree.

This is considered to be an important effect as the condensation of the carrier fluid polymer not only increases viscosity and reduces processability but consequently will reduces the number of available crosslink sites during the cure of condensation curable organosiloxane compositions to their respective elastomers producing a softer (lower durometer) material. This has been further evaluated by the elastomer studies below.

Formulated Part A

Unaged samples of Comp. 1, Comp. 2 and Ex. 1 additive concentrates were then used in the preparation of respective two-part condensation curable organosiloxane compositions. The respective additive concentrate was mixed into a part A composition using the compositions indicated in Table 2a below.

Table 2a Part A composition of Comps. 3 and 4 and Ex. 2

|  | Comp. 3 (Part A) | Comp. 4 (Part A) | Ex. 2 (Part A) |
|---|---|---|---|
| Comp. 1 | 53.7 | | |
| Comp. 2 | | 53.7 | |
| Ex. 1 | | | 53.7 |
| Tetrapropyloxysilane | 2.7 | 2.7 | 2.7 |
| Celite ® Super Floss ® E Diatomaceous Earth having a median particle size of 12.2 µm (supplier information) | 22.5 | 22.5 | 22.5 |
| dimethylsilanol terminated polydimethylsiloxane having a viscosity of 2000 mPa · s at 25° C. | 20.6 | 20.6 | 20.6 |
| Liquid carrier (ii) described above | 0.37 | 0.37 | 0.37 |

Celite® Super Floss® E Diatomaceous Earth is commercially available from World Materials Inc.

The same part B composition was used in each example and this is depicted in Table 2b below.

TABLE 2b

| Part B composition | |
|---|---|
| Composition | Wt. % |
| trimethyl terminated polydimethylsiloxane having a viscosity of 30,000 mPa · s at 25° C. | 76.2 |
| dimethyltin dineodecanoate (DMTDN) | 5.4 |
| Precipitated treated Calcium Carbonate having a median particle size of 1.9 µm | 15.8 |
| benzotriazole in a 1:2 weight ratio mixture with trimethyl terminated polydimethylsiloxane | 1.1 |
| water | 1.5 |

The part A compositions of comp. 3, comp. 4 and Ex. 2 respectively were mixed with the part B composition in a 10:1 parts by weight ratio in a speed mixer at 2400 rpm for 30 seconds. The resulting blend was then poured into a mold and allowed to cure for 48 hours at room temperature before test specimens were cut and measured.

Further part A samples were prepared and placed in an oven at 50° C. for 7 and 14 days respectively to simulate an accelerated aging protocol before being allowed to cool to room temperature. Once at room temperature they were mixed with the part B composition in the manner described above and cured in the same way. The resulting elastomers were tested for Hardness, tensile strength, Elongation and MDR (S'Max) for comp. 3, comp. 4 and Ex. 2 in Tables 2c, 2d and 2e respectively.

TABLE 2c

| Comp. 3 Elastomer Physical Property Results | | | | |
|---|---|---|---|---|
| | Durometer | Tensile Strength (MPa) | Elongation | MDR (S'Max) |
| 0 day 50° C. | 41 | 2 | 140 | 4 |
| 7 day 50° C. | 39 | 2 | 163 | 3 |
| 14 days 50° C. | 34 | 2 | 157 | 3 |

TABLE 2d

Comp. 4 Elastomer Physical Property Results

| | Durometer | Tensile Strength (MPa) | Elongation | MDR (S'Max) |
|---|---|---|---|---|
| 0 day 50° C. | 5 | 1 | 241 | 0 |
| 7 day 50 C | N/A | N/A | N/A | 0 |

N/A = Not measured due to end of experimentation

TABLE 2e

Ex. 2 Elastomer Physical Property Results

| | Durometer | Tensile Strength (MPa) | Elongation | MDR (S'Max) |
|---|---|---|---|---|
| 0 day 50° C. | 46 | 2 | 121 | 4 |
| 7 day 50° C. | 43 | 2 | 144 | 4 |
| 14 days 50° C. | 43 | 2 | 136 | 4 |

The Durometer results were with respect to Shore A and were measured in accordance with ASTM C661-15. The tensile strength results were measured in accordance with ASTM D412-98a(2002)e1 using Die C. Moving die rheometer (MDR) (S'Max) results were measured using a Monsanto MDR 2000 moving die rheometer from Monsanto, first mixing the part A and part B compositions, adding the resulting mixture to the bottom plate at 248° C. for 14 minutes with the S'Max (maximum torque) value recorded when material cured.

The comparative additive concentrates of comp. 2 and comp. 4 using magnesium oxide (MgO) as stabilizer showed moderate retardation of viscosity growth, but when introduced into the condensation curable organosiloxane compositions caused incomplete cure leading to extremely soft elastomeric materials with durometer values as low as 5 and incomplete cured tacky sample plates.

Inventive Example 2 where the Part A contains an additive concentrate with 1% additional trimethyl terminated polydimethylsiloxane as stabilizer, exhibits sustained performance shown by maintained values for durometer, tensile strength, elongation and maximum torque as measured with a moving die rheometer.

Comparative example 3 which uses an additive concentrate with no stabilizer, shows a decrease in the critical values for durometer and maximum torque whilst showing an increase in elongation.

These results for elastomers made using the composition of Comparative Example 3, indicates that the cured elastomeric material did not cure properly due to, in our view, a reduced number of final crosslinks due to the pre-condensation of the dimethylsilanol terminated polydimethylsiloxane having a viscosity of 2000 mPa·s at 25° C. contained in the formulation and the lack of a suitable stabilizer as described herein.

The invention claimed is:

1. A process for preparing a stabilized additive concentrate suitable for use in condensation curable organosiloxane compositions, said process comprising:
   mixing:
   (i) a solid additive in an amount of from 25 to 80 wt. % of the composition concentrate with
   (ii) a liquid carrier comprising a dialkylsilanol terminated polydiorganosiloxane polymer in an amount of from 20 to 75 wt. % of the composition concentrate with
   (iii) (iii) a stabilizer comprising or consisting of a polydialkylsiloxane having the general formula:

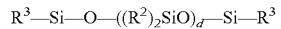

where $R^2$ is an alkyl or phenyl group, each $R^3$ group may be the same or different and are selected from $R^2$, alkenyl, or alkynyl groups and the average value of d is between 7 and 20, in an amount of from 0.5 to 5 wt. % of the concentrate.

2. The process for preparing a stabilized additive concentrate in accordance with claim 1, wherein solid additive (i) is selected from a solid additive utilised in a condensation curable organosiloxane composition selected from non-reinforcing fillers, electrically conducting fillers, heat conducting fillers, pigments, co-catalysts, heat stabilizing agents, flame retardants, UV stabilizers, fungicides and/or biocides and encapsulated fungicides and/or biocides.

3. The process for preparing a stabilized additive concentrate in accordance with claim 1, wherein solid additive (i) produces an acidic solution when dissolved in water.

4. The process for preparing a stabilized additive concentrate in accordance with claim 1, wherein the stabilized additive concentrate is one or more pigments or heat stabilizing agents or a mixture thereof.

5. The process for preparing a stabilized additive concentrate in accordance with claim 4, wherein the one or more pigments or heat stabilizing agents or a mixture thereof is selected from yellow iron oxide, red iron oxide, black iron oxide, carbon black, titanium dioxide, chromium oxide, bismuth vanadium oxide, zinc oxide, cerium oxide, cerium hydroxide and/or mixtures thereof.

6. The process for preparing a stabilized additive concentrate in accordance with claim 5, wherein the one or more pigments or heat stabilizing agents or a mixture thereof is selected from yellow iron oxide, red iron oxide and/or black iron oxide.

7. The process for preparing a stabilized additive concentrate in accordance with claim 1, wherein liquid carrier (ii) is a dialkylsilanol terminated polydimethylsiloxane having the structure

in which each R is an alkyl, alkenyl or aryl group; each $R^1$ may be the same or different and is a hydroxyl group, hydrolysable group, alkyl group, alkenyl group or aryl group; v is 0, 1 or 2, and w is an integer such that said dialkylsilanol terminated polydiorganosiloxane has a viscosity of from 5,000 to 50,000 mPa·s at 25° C.

8. The process for preparing a stabilized additive concentrate in accordance with claim 1, wherein the average value of d in stabilizer (iii) is between 7 and 15.

9. A stabilized additive concentrate obtained or obtainable by the process of claim 1.

10. A process for preparing a condensation curable organosiloxane composition, said process comprising:
   preparing at least one stabilized additive concentrate (e) in accordance with claim 1; and
   mixing stabilized additive concentrate (e) with
   (a) a polydiorganosiloxane having at least two hydroxy groups or hydrolysable groups per molecule,
   (b) one or more silane or siloxane cross-linkers reactive with the at least two hydroxy groups or hydrolysable groups of polydiorganosiloxane (a),
   (c) a condensation cure catalyst, and
   (d) one or more reinforcing fillers or semi-reinforcing fillers.

11. A condensation curable organosiloxane composition obtained or obtainable by:
  preparing at least one stabilized additive concentrate (e) in accordance with claim 1;
  mixing stabilized additive concentrate (e) with
  (a) a polydiorganosiloxane having at least two hydroxy groups or hydrolysable groups per molecule,
  (b) one or more silane or siloxane cross-linkers reactive with the at least two hydroxy groups or hydrolysable groups of polydiorganosiloxane (a),
  (c) a condensation cure catalyst, and
  (d) one or more reinforcing fillers or semi-reinforcing fillers.

12. The condensation curable organosiloxane composition in accordance with claim 11, wherein the composition is stored in two or more parts prior to utilization.

13. A condensation curable organosiloxane composition comprising the stabilized additive concentrate prepared in accordance with claim 1.

14. The condensation curable organosiloxane composition in accordance with claim 13, suitable as a coating, a caulking, a sealing, a mold making or an encapsulating material.

15. The condensation curable organosiloxane composition in accordance with claim 13, suitable in solar, automotive, electronics, construction and/or structural glazing and/or insulating glazing applications.

* * * * *